US009546615B2

(12) United States Patent
Melnyk (10) Patent No.: US 9,546,615 B2
(45) Date of Patent: Jan. 17, 2017

(54) AIR-FUEL RATIO CONTROL IN A MULTI-FUEL INTERNAL COMBUSTION ENGINE

(71) Applicant: Westport Power Inc., Vancouver (CA)

(72) Inventor: Borys J. Melnyk, Plymouth, MI (US)

(73) Assignee: WESTPORT POWER INC., Vancouver (CA)

( * ) Notice: Subject to any disclaimer, the term of this patent is extended or adjusted under 35 U.S.C. 154(b) by 32 days.

(21) Appl. No.: 14/738,835

(22) Filed: Jun. 13, 2015

(65) Prior Publication Data

US 2015/0308366 A1    Oct. 29, 2015

Related U.S. Application Data

(63) Continuation of application No. PCT/CA2013/050977, filed on Dec. 17, 2013.
(Continued)

(51) Int. Cl.
*B60T 7/12* (2006.01)
*F02D 41/30* (2006.01)
(Continued)

(52) U.S. Cl.
CPC ......... *F02D 41/3047* (2013.01); *F02D 19/081* (2013.01); *F02D 41/0025* (2013.01);
(Continued)

(58) Field of Classification Search
CPC .... F02D 19/023; F02D 19/0626; F02D 19/00; F02M 37/0064
(Continued)

(56) References Cited

U.S. PATENT DOCUMENTS 5,450,829 A    9/1995 Beck
5,553,575 A    9/1996 Beck et al.
(Continued)

FOREIGN PATENT DOCUMENTS

EP    1358399 B1    8/2006
WO    0277427 A1    10/2002

OTHER PUBLICATIONS

International Search Report of the International Searching Authority issued on Feb. 26, 2014, in connection with International Application No. PCT/CA2013/050977.
(Continued)

*Primary Examiner* — John Kwon
(74) *Attorney, Agent, or Firm* — Carie Mager; C. L. Kyle (57) ABSTRACT

A technique for controlling air-fuel ratio in an internal combustion engine consuming more than one fuel type includes determining a target air-fuel ratio as a function of engine operating conditions; determining an actual air-fuel ratio from the engine operating conditions; determining a first fuel quantity of a first fuel to introduce into a combustion chamber as a function of the engine operating conditions; determining a second fuel quantity of a second fuel such that the actual air-fuel ratio equals the target air-fuel ratio to within a predetermined range of tolerance when the first fuel quantity and the second fuel quantity are introduced into the combustion chamber, the second fuel quantity being determined as a function of the engine operating conditions, the target air-fuel ratio, the actual air-fuel ratio and the first fuel quantity; and introducing the first fuel quantity and the second fuel quantity into the combustion chamber.

22 Claims, 7 Drawing Sheets

Related U.S. Application Data (60) Provisional application No. 61/745,593, filed on Dec. 22, 2012.

(51) Int. Cl.
*F02D 41/14* (2006.01)
*F02D 41/00* (2006.01)
*F02D 41/38* (2006.01)
*F02D 19/08* (2006.01)

(52) U.S. Cl.
CPC ..... *F02D 41/0027* (2013.01); *F02D 41/1454* (2013.01); *F02D 41/3094* (2013.01); *F02D 41/38* (2013.01); *F02D 2041/389* (2013.01); *Y02T 10/36* (2013.01)

(58) Field of Classification Search
USPC ......... 701/103–105, 114, 115; 123/434, 437, 123/525, 575, 576, 577
See application file for complete search history.

(56) References Cited

U.S. PATENT DOCUMENTS

| | | | |
|---|---|---|---|
| 5,608,161 A | 3/1997 | Pischinger | |
| 5,666,923 A | 9/1997 | Collier, Jr. et al. | |
| 6,273,076 B1 | 8/2001 | Beck et al. | |
| 6,907,870 B2 | 6/2005 | zur Loye et al. | |
| 7,044,103 B2 | 5/2006 | May | |
| 7,270,089 B2 | 9/2007 | Wong | |
| 2006/0225694 A1* | 10/2006 | Brachert | F02D 13/0265 123/295 |
| 2009/0281709 A1* | 11/2009 | Mallebrein | F02D 35/025 701/104 |
| 2010/0043746 A1* | 2/2010 | Hartmann | F02D 19/0692 123/299 |
| 2010/0138135 A1* | 6/2010 | Hacker | F02D 41/0085 701/102 |
| 2010/0332106 A1 | 12/2010 | Vanderslice et al. | |
| 2011/0213547 A1 | 9/2011 | Reed et al. | |
| 2011/0288745 A1 | 11/2011 | Warner et al. | |
| 2012/0055457 A1 | 3/2012 | Wong et al. | |
| 2013/0327297 A1* | 12/2013 | Sgatti | F02D 41/2467 123/456 |
| 2014/0100761 A1* | 4/2014 | Empacher | F02D 41/2467 701/104 |
| 2015/0192086 A1* | 7/2015 | Gutscher | F02D 41/2432 123/478 |
| 2016/0003168 A1* | 1/2016 | Leone | F02D 17/02 123/406.47 |
| 2016/0003169 A1* | 1/2016 | Leone | F02D 41/0087 123/481 |
| 2016/0069284 A1* | 3/2016 | Lorenz | F02D 41/047 701/104 |

OTHER PUBLICATIONS

International Preliminary Report on Patentability issued on Jun. 23, 2015, in connection with International Application No. PCT/CA2013/050977.

\* cited by examiner

AIR-FUEL RATIO CONTROL IN A MULTI-FUEL INTERNAL COMBUSTION ENGINE

CROSS-REFERENCE TO RELATED APPLICATIONS

This application is a continuation of International Application No. PCT/CA2013/050977 having a filing date of Dec. 17, 2013, entitled "Air-Fuel Ratio Control in a Multi-Fuel Internal Combustion Engine", which claimed priority benefits from U.S. provisional patent application No. 61/745,593 filed on Dec. 22, 2012. The PCT/CA2013/050977 international application and 61/745,593 provisional application are hereby incorporated by reference in their entirety.

FIELD OF THE INVENTION

The present application relates to a technique of air-fuel ratio control in a multi-fuel internal combustion engine. In a preferred embodiment air-fuel ratio is controlled in a gaseous fueled, throttled engine employing a liquid pilot fuel.

BACKGROUND OF THE INVENTION

A Diesel-cycle engine can be fueled with natural gas instead of diesel to obtain emission and economic benefits. In these engines a diesel pilot fuel is often employed since the auto-ignition temperature of natural gas is greater than that of diesel. A small amount of diesel, normally around 5% of total fuel introduced to the combustion chamber, is injected along with the main natural gas fuel. The diesel ignites due to compression heat and subsequently the natural gas is ignited due to the combustion of diesel.

Air-fuel ratio is an important engine parameter that influences emissions and fuel usage of gaseous fueled engines. Air-fuel ratio can be expressed as the excess air ratio which is the ratio of the actual air-fuel ratio to the stoichiometric air-fuel ratio (when all the oxygen and fuel are consumed during combustion). The excess air ratio can also be referred to as lambda ($\lambda$). Another parameter related to air-fuel ratio if the fuel-air ratio, which is simply the inverse. Similarly, the equivalence ratio is the ratio of the actual fuel-air ratio to the stoichiometric fuel-air ratio. As used herein these terms are used interchangeably to describe the relationship of air with fuel in the combustion process. In premixed engines the excess air ratio is controlled to within a narrow range of the stoichiometric value (1). Conventional diesel-cycle engines that fuel from diesel typically operate lean and with a broad range of excess air ratios, for example with lambda somewhere between 1.3 at full power and 10 at idle. Gaseous fueled engines can operate with lambda similar to the premix engine or the diesel engine depending upon how the gaseous fuel is introduced to the combustion chamber, for example whether it is introduced upstream of an intake valve or directly introduced into the combustion chamber.

Known techniques for air-fuel ratio control comprise adjusting fueling quantity along with manifold absolute pressure (MAP) and air charge temperature (ACT). For example, U.S. Pat. No. 6,273,076, issued Aug. 14, 2001 to Beck et al., discloses a method of optimizing excess air ratio in a diesel-cycle engine on a full time, full range basis. In diesel-cycle engines, which operate lean, the demanded torque is achieved by controlling the fueling quantity. During a transient condition when the operator is demanding a new torque the fueling quantity changes, and in the steady state condition when there is no change in demanded torque the excess air ratio is controlled by adjusting the air supply. The method disclosed by Beck includes a step of adjusting a fuel quantity when the difference between an optimum lambda value and an actual lambda value (the error signal) is large. This indicates transient engine operation, for example a sudden and sharp increase or decrease in commanded power. After adjusting the fuel quantity, or instead of adjusting fuel quantity when there is no transient engine condition, the method includes the step of adjusting the air supply to minimize the error signal.

U.S. Pat. No. 7,270,089, issued Sep. 18, 2007 to Hoi Ching Wong, discloses a method of controlling excess air ratio when transitioning between operating modes of a dual fuel engine. The engine is preferably configured to operate in the pilot ignited gaseous fuel mode during as much of its speed and load range as practical except under (1) low speed and high load conditions and (2) light load and all speed conditions where it operates in diesel mode. During transition the method of Wong takes gas lambda in pilot ignited gaseous fuel mode and diesel lambda in diesel mode into consideration during transition between operating modes to avoid undesired or premature switching between modes. Other techniques for optimizing and controlling Lambda include skip fire techniques where for lighter loads some cylinders can be deactivated such that more fuel is injected in the remaining active cylinders which allows the lambda value to be decreased in these cylinders.

Conventional techniques of excess air ratio control do not teach precise control of lambda in a throttled engine operating near stoichiometry and where a premixed charge of natural gas is introduced into the cylinder and ignited by a pilot fuel. In such an engine there is a need for an excess air ratio control technique that allows lambda to be controlled when disproportionate amounts of fuel are consumed. For example, a preferred control technique exercises control over lambda when under light load conditions the fuel composition comprises 10% natural gas and 90% pilot fuel and under heavy load conditions when the fuel composition comprises 95% natural gas and 5% pilot fuel. Over the range of engine operating conditions the preferred control technique provides fast transient response and stable steady state operation to maintain lambda at or near the desired value.

The state of the art is lacking in techniques for closed loop fuel control in an engine that consumes more than one fuel type simultaneously and where the variability in the quantity of one fuel is much greater than the variability in the quantity of the other fuel. The present method and apparatus provide an improved technique for controlling air-fuel ratio in a multi-fuel internal combustion engine.

SUMMARY OF THE INVENTION

An improved method for controlling air-fuel ratio in an internal combustion engine consuming more than one fuel type comprises (a) determining a target air-fuel ratio as a function of engine operating conditions; (b) determining an actual air-fuel ratio from the engine operating conditions; (c) determining a first fuel quantity of a first fuel to introduce into a combustion chamber of the internal combustion engine as a function of the engine operating conditions; (d) determining a second fuel quantity of a second fuel such that the actual air-fuel ratio equals the target air-fuel ratio to within a predetermined range of tolerance when the first fuel quantity and the second fuel quantity are introduced into the combustion chamber, the second fuel quantity is determined as a function of the engine operating conditions, the target air-fuel ratio, the actual air-fuel ratio and the first fuel quantity; and (e) introducing the first fuel quantity and the second fuel quantity into the combustion chamber. The method further comprises (f) repeating steps (b) and (e) when the engine operating conditions remain unchanged within a predetermined range of tolerance; and (g) for each repetition of step (b), at least repeating step (d) when the actual air-fuel ratio determined in step (b) is not equal to the target air-fuel ratio to within a predetermined range of tolerance.

The first fuel can be a liquid fuel, such as diesel, and the second fuel can be a gaseous fuel, such as natural gas. The second fuel can be selected from the group consisting of ethane, methane, propane, biogas, landfill gas, hydrogen and mixtures thereof. The first fuel can be a pilot fuel and the second fuel can be a main fuel. The first fuel can be directly introduced into the combustion chamber and the second fuel can be introduced into a suction pipe upstream of an intake valve of the combustion chamber. The target air-fuel ratio corresponds to an excess air-fuel ratio of one to within a predetermined range of tolerance. In some embodiments the internal combustion engine can be throttled.

The method further comprises calculating an air-fuel ratio error as the difference between the target air-fuel ratio and the actual air-fuel ratio; and in step (d), determining the second fuel quantity as a function of the engine operating conditions, the target air-fuel ratio, the air-fuel ratio error and the first fuel quantity. The second fuel quantity equals a first amount of the second fuel plus a second amount of the second fuel, the first amount equal to a function of the engine operating conditions, the target air-fuel ratio and the first fuel quantity, the second amount equal to a function of the air-fuel ratio error. The function of the air-fuel ratio error corresponds to at least one of a proportional control module, an integral control module and a derivative control module, each of the control modules responsive to the air-fuel ratio error. Alternatively, the function of the air-fuel ratio error can correspond to a control module responsive to the air-fuel ratio error and operable to adjust the second fuel quantity to reduce the air-fuel ratio error to zero within the predetermined range of tolerance. The function for determining the second fuel quantity comprises a gain that is one of a function of a percentage of total fuel of the first fuel quantity and a function of a percentage of total fuel of the second fuel quantity.

In step (c) of the method, the first fuel quantity can be determined as a function of at least one of the engine operating conditions, the target air-fuel ratio, the actual air-fuel ratio and the second fuel quantity. When the target air-fuel ratio is not equal to the actual air-fuel ratio to within a predetermined range of tolerance the first fuel quantity and the second fuel quantity are adjusted by at least one of an equal percentage and an equal amount within a range of tolerance.

When the target air-fuel ratio is not equal to the actual air-fuel ratio to within a predetermined range of tolerance the first fuel quantity and the second fuel quantity are adjusted by at least one of a different percentage and a different amount. The second quantity of the second fuel can be determined according to the formula:

$$F_{ngb\sim s}\left(-1 + \frac{\%NG}{100}\right) + \frac{F_{ngb\sim s}}{\lambda_{target}} + F_{ngb\sim s}(I + P)$$

where:

$F_{ngb\sim s}$ is a base quantity of natural gas, determined from a base map indexed by engine operating conditions or from a base function of engine operating conditions, employed for an internal combustion engine operating with the second fuel only at stoichiometry;

% NG is a percentage of total fuel that is the second fuel;

$\lambda_{target}$ is the target air-fuel ratio;

I is an integral control term; and

P is a proportional control term.

An improved apparatus for controlling air-fuel ratio in an internal combustion engine consuming more than one fuel type comprising a direct fuel injector introducing a first fuel into a combustion chamber of the internal combustion engine; a second fuel injector introducing a second fuel into the combustion chamber; an electronic control programmed to (a) determine a target air-fuel ratio as a function of engine operating conditions; (b) determine an actual air-fuel ratio from the engine operating conditions; (c) determine a first fuel quantity of the first fuel to introduce through the direct fuel injector as a function of the engine operating conditions; (d) determine a second fuel quantity of the second fuel such that the actual air-fuel ratio equals the target air-fuel ratio to within a predetermined range of tolerance when the first fuel quantity and the second fuel quantity are introduced into the combustion chamber, the second fuel quantity determined as a function of the engine operating conditions, the target air-fuel ratio, the actual air-fuel ratio and the first fuel quantity; and (e) actuate the direct fuel injector to introduce the first fuel quantity and the second fuel injector to introduce the second fuel quantity into the combustion chamber. The second fuel injector can introduce the second fuel into a suction pipe upstream of an intake valve of the combustion chamber, or can introduce the second fuel directly into the combustion chamber.

DETAILED DESCRIPTION OF ILLUSTRATIVE EMBODIMENT(S)

Figure 1:
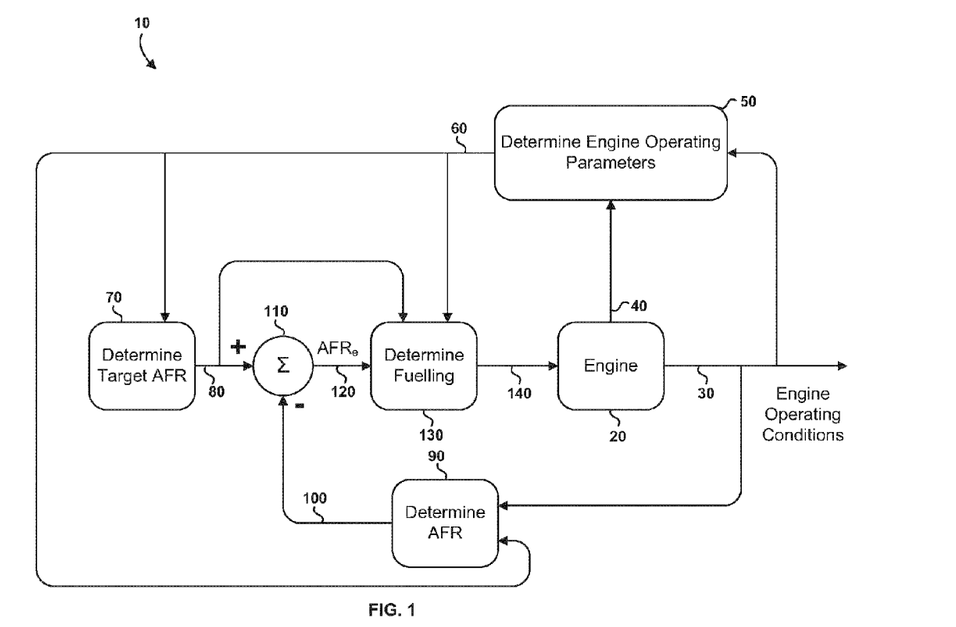
FIG. 1 is a block diagram of a closed loop control system for air-fuel ratio control in a multi-fuel internal combustion engine according to one embodiment.

Referring to FIG. 1, closed loop control system 10 for air-fuel ratio control in a multi-fuel engine is shown according to one embodiment. Engine 20 is an internal combustion engine that consumes at least two types of fuel. In the present embodiment engine 20 consumes a gaseous fuel as a main fuel and a liquid fuel as a pilot fuel. The main fuel primarily contributes towards generating torque. The pilot fuel, which ignites through compression ignition, primarily contributes towards igniting the main fuel through its own combustion which increases the pressure and temperature in a combustion chamber or cylinder of engine 20. The main fuel typically has a relatively high octane number and the pilot fuel typically has a relatively high cetane number, such that the main fuel is not readily ignitable by compression ignition while the pilot fuel is more readily ignitable by compression ignition. The main fuel can be introduced into the combustion chamber upstream of an intake valve in engine 20 where suction from an intake stroke of the cylinder draws fuel and air therein, or can be directly introduced into the cylinder. The pilot fuel is typically directly introduced into the combustion chamber. In other embodiments the two fuels can be considered a first fuel and a second fuel, either of which can be introduced into a suction pipe upstream of the intake valve or directly into the combustion chamber, and in these other embodiments different ignition techniques can be employed to ignite these two fuels, for example spark ignition and hot surface ignition. In still further embodiments there can be more than two fuels for which the technique of air-fuel ratio control described herein can be applied. In FIG. 1 line 30 represents current operating conditions of engine 20 comprising air mass flow, manifold pressure, engine speed, engine coolant temperature, air temperature, exhaust gas composition, exhaust gas amount, exhaust temperature and other engine parameters. Line 40 represents engine operating conditions that are under operator control such as throttle position, accelerator position, key ignition and gear selection (when controlled by the operator) which influence the engine operating conditions of line 30. Module 50 determines engine operating parameters 60 of engine 20 by measurement of engine operating conditions 30 and 40 and corresponding calculations.

As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. In preferred embodiments the modules herein are part of an engine control unit.

Signals from sensors in engine 20 that are representative of engine operating conditions 30 and 40 are received by module 50. Some engine operating parameters 60 are not directly measured but are determined from look-up tables and/or formulas, both of which can employ as inputs at least one of the sensor signals and other engine operating parameters 60. The controlled parameter in control system 10 is air-fuel ratio, which is controlled by determining a target air-fuel ratio and then operating engine 10 such that an actual air-fuel ratio equals the target air-fuel ratio to within a predetermined range of tolerance. In this manner module 70 determines target air-fuel ratio 80 as a function of engine operating parameters 60. Module 90 determines actual air-fuel ratio 100 as a function of engine operating conditions 30, and alternatively or additionally as a function of engine operating parameters 60. Actual air-fuel ratio 100 can be determined in a conventional manner which comprises both indirect and direct techniques. It is preferable that one of the direct techniques are employed, for example one of the techniques that measures oxygen content in the exhaust gas using an exhaust gas oxygen sensor (EGO) or more preferably a universal exhaust gas oxygen sensor (UEGO). Air-fuel ratio error 120 is determined by summation module 110 which subtracts actual air-fuel ratio 100 from target air-fuel ratio 80. Fueling Determination Module 130 is responsive to air-fuel ratio error 120, engine operating parameters 60 and target air-fuel ratio 80 to determine fueling quantity 140 for engine 20. Fueling quantity 140 is representative of the total fueling quantity for engine 20 (the total quantity of fuel introduced to cylinders of engine 20) and can be in the form of fuel injector actuation signals and signals operable to adjust and maintain fuel pressures. Engine 20 responds to fueling quantity 140 such that air-fuel ratio error 120 is driven to within a predetermined range of tolerance and preferably to zero.

Figure 2:
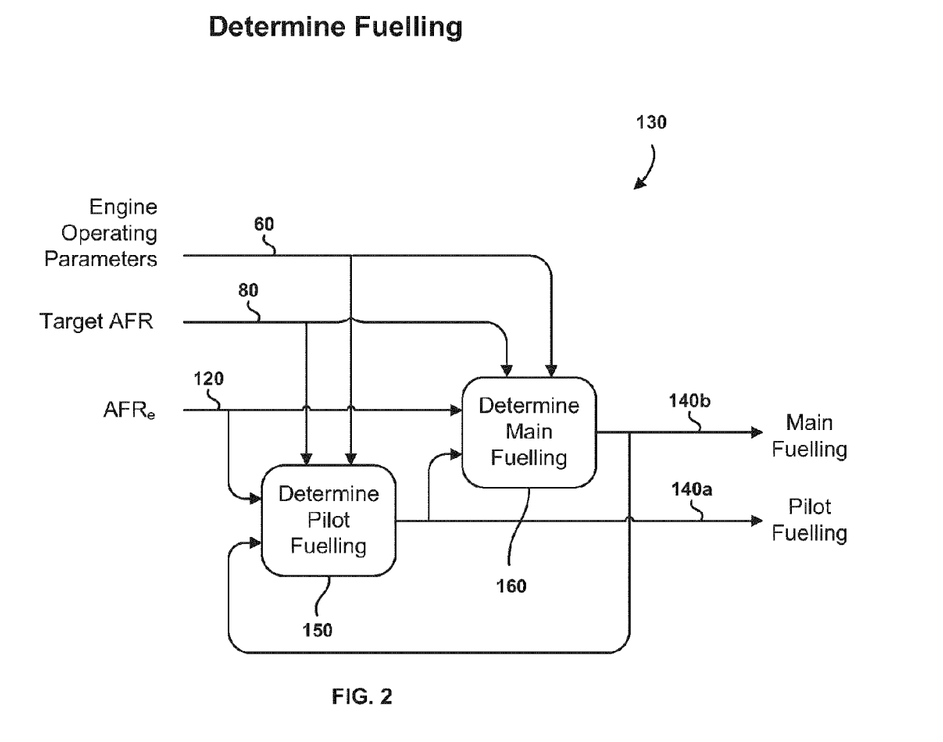
FIG. 2 is a block diagram of a fuel determination step in the closed loop control system of FIG. 1.

Referring now to FIG. 2, fueling determination module 130 is described in more detail. Pilot fueling determination module 150 determines pilot fueling quantity 140*a* in response to engine operating parameters 60, target air-fuel ratio 80 and air-fuel ratio error 120. Main fueling determination module 160 determines main fueling quantity 140*b* in response to engine operating parameters 60, target air-fuel ratio 80, air-fuel ratio error 120 and pilot fueling quantity 140*a*. In some embodiments module 150 is also responsive to main fueling quantity 140*b*. Fueling quantity 140, as seen in FIG. 1, comprises pilot fueling quantity 140*a* and main fueling quantity 140*b*.

Figure 3:
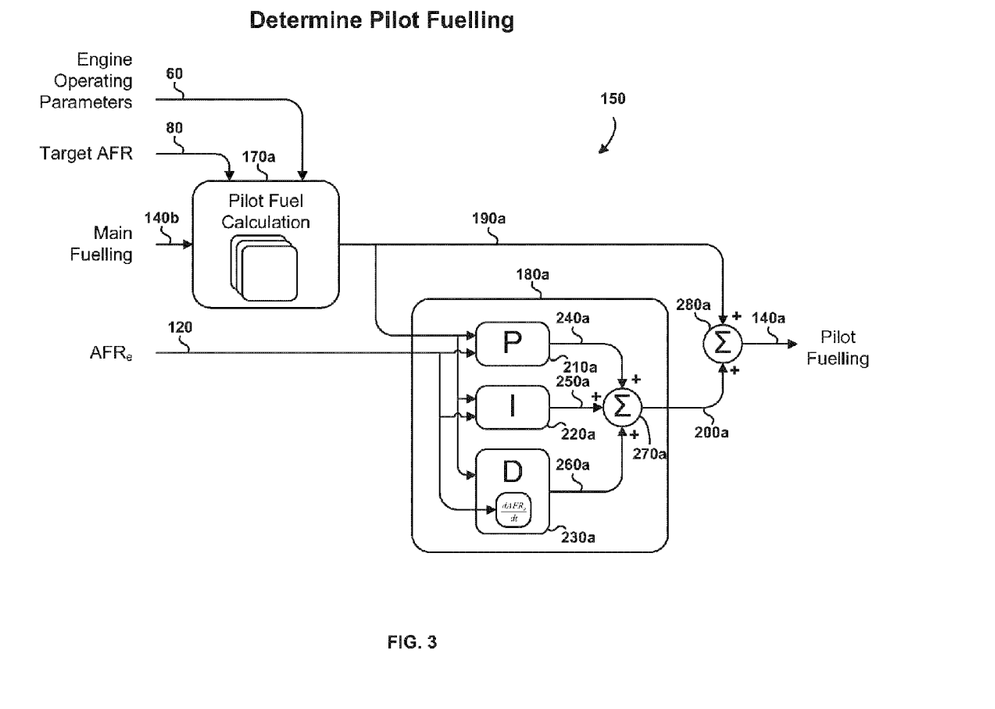
FIG. 3 is a block diagram of a first fuel determination step in the fuel determination step of FIG. 2.

Referring to FIG. 3, pilot fueling determination module 150 is now discussed in more detail. Module 150 comprises default amount determination module 170*a* and control module 180*a*. Module 170*a* determines pilot fuel default amount 190*a* in response to engine operating parameters 60, target air-fuel ratio 80 and, optionally, main fueling quantity 140*b*. Module 170*a* employs look-up tables and/or formulas, which will be described in more detail below, to determine default amount 190*a*. Default amount 190*a* comprises calibrated values of pilot fuel for associated engine operating parameters 60 and target air-fuel ratio 80. Control module 180*a* determines pilot fuel error amount 200*a* in response to air-fuel ratio error 120. In one embodiment control module 180*a* employs a PID-type control comprising at least one of proportional control module 210*a*, integration control module 220*a* and derivative control module 230*a*, and preferably at least proportional and integration control modules 210*a* and 220*a*. In other embodiments control module 180*a* can employ other control techniques known to this familiar with control technology. Each of the control modules 210*a*, 220*a* and 230*a* are responsive to air-fuel ratio error 120 and pilot fuel default amount 190*a* to provide proportional signal 240*a*, integral signal 250*a* and derivative signal 260*a* respectively. Summation module 270*a* generates pilot fuel error amount 200*a* by adding signals 240*a*, 250*a* and 260*a*. Summation module 280*a* generates pilot fueling quantity 140*a* by adding pilot fuel default amount 190*a* and pilot fuel error amount 200*a*.

Figure 4:
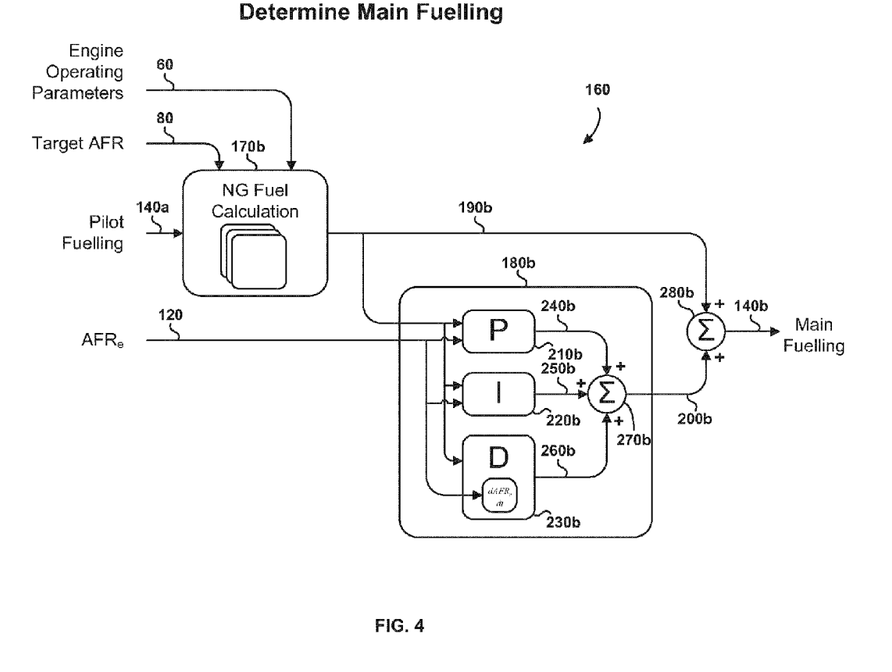
FIG. 4 is a block diagram of a second fuel determination step in the fuel determination step of FIG. 2.

Referring to FIG. 4, main fueling determination module 160 is now discussed in more detail. Module 160 comprises default amount determination module 170*b* and control module 180*b*. Module 170*b* determines main fuel default amount 190*b* in response to engine operating parameters 60, target air-fuel ratio 80 and pilot fueling quantity 140*a*. Module 170*b* employs look-up tables and/or formulas, which will be described in more detail below, to determine default amount 190*b*. Default amount 190*b* comprises calibrated values of main fuel for associated engine operating parameters 60 and target air-fuel ratio 80. Control module 180*b* determines main fuel error amount 200*b* in response to air-fuel ratio error 120. In one embodiment control module 180*b* employs a PID-type control comprising at least one of proportional control module 210*b*, integration control module 220*b* and derivative control module 230*b*, and preferably at least proportional and integration control modules 210*b* and 220*b*. In other embodiments control module 180*b* can employ other control techniques known to this familiar with control technology. Each of the control modules 210b, 220b and 230b are responsive to air-fuel ratio error 120 and main fuel default amount 190b to provide proportional signal 240b, integral signal 250b and derivative signal 260b respectively. Summation module 270b generates main fuel error amount 200b by adding signals 240b, 250b and 260b. Summation module 280b generates main fueling quantity 140b by adding main fuel default amount 190b and main fuel error amount 200b.

Referring to both FIGS. 3 and 4, control modules 180a and 180b are discussed in more detail. Control modules 180a and 180b are both optional, however at least one of these control modules enables practicing the present technique of air-fuel ratio control. In some embodiments pilot fuel control module 180a is not employed such that pilot fueling quantity 140a is equal to pilot fuel default amount 190a. In other embodiments main fuel control module 180b is not employed such that main fueling quantity 140b is equal to main fuel default amount 190b. When both are employed, control modules 180a and 180b can adjust fueling quantities 140a and 140b respectively by any one of an equal amount or percentage within a predetermined range of tolerance, a different amount or percentage, and separately and independently.

Figure 5:
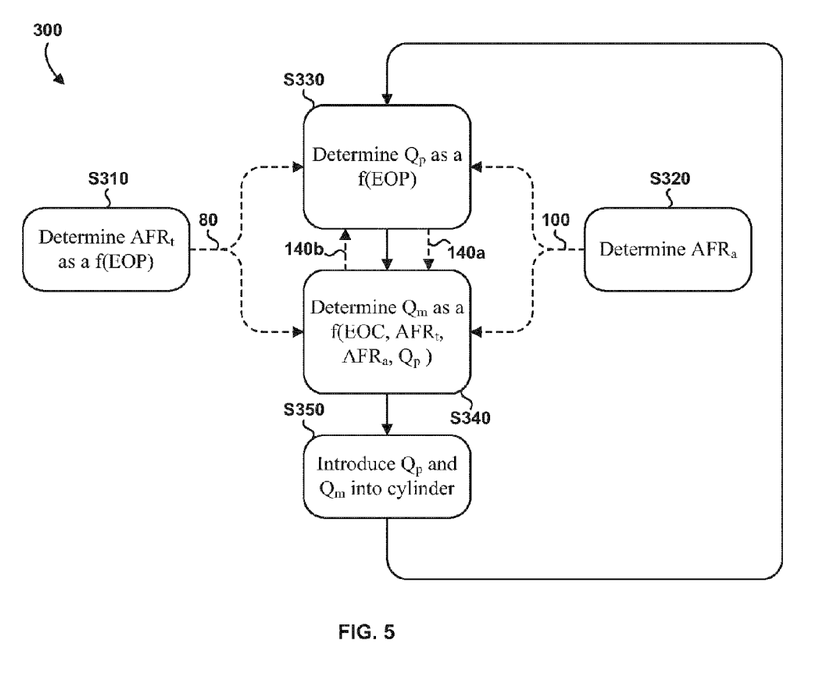
FIG. 5 is a flowchart diagram of an algorithm for the closed loop control system of FIG. 1.

Referring now to FIG. 5, algorithm module 300 for operating closed-loop control system 10 is discussed. In module 300, the dashed lines represent parameters that are provided to respective steps in the algorithm, and the solid lines interconnecting the steps represent algorithmic flow. In step S310 target air-fuel ratio 80 is determined in response to engine operating parameters 60. In step S320 actual air-fuel ratio 100 is determined in response to engine operating conditions 30 and/or engine operating parameters 60. Pilot fueling quantity 140a is determined in step S330 in response to engine operating parameters 60, target air-fuel ratio 80, actual air-fuel ratio 100 and, optionally, main fueling quantity 140b. Main fueling quantity 140b is determined in step S340 in response to engine operating parameters 60, target air-fuel ratio 80, actual air-fuel ratio 100 and pilot fueling quantity 140a. Pilot fueling quantity 140a and main fueling quantity 140b are introduced into the cylinders of engine 20 in step S350. Although FIG. 5 illustrates steps S330, S340 and S350 being performed in a sequential, repetitive manner while engine 20 is operating, this is not a requirement. For example, while pilot and main fueling quantities 140a and 140b are introduced to the cylinders for each cycle of engine 20, they do not need to be recalculated or updated for each cycle. Preferably they are at least recalculated when engine operating parameters 60 and air-fuel ratio error 120 change by predetermined amounts.

Figure 6:
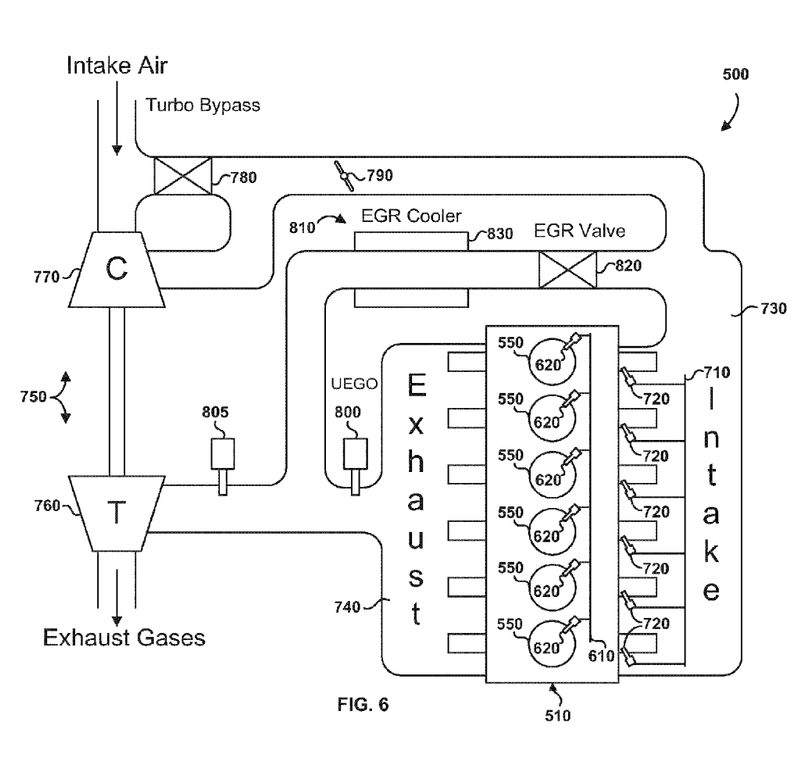
FIG. 6 is a schematic view of a throttled internal combustion engine employing the closed loop control system of FIG. 1.
Figure 7:
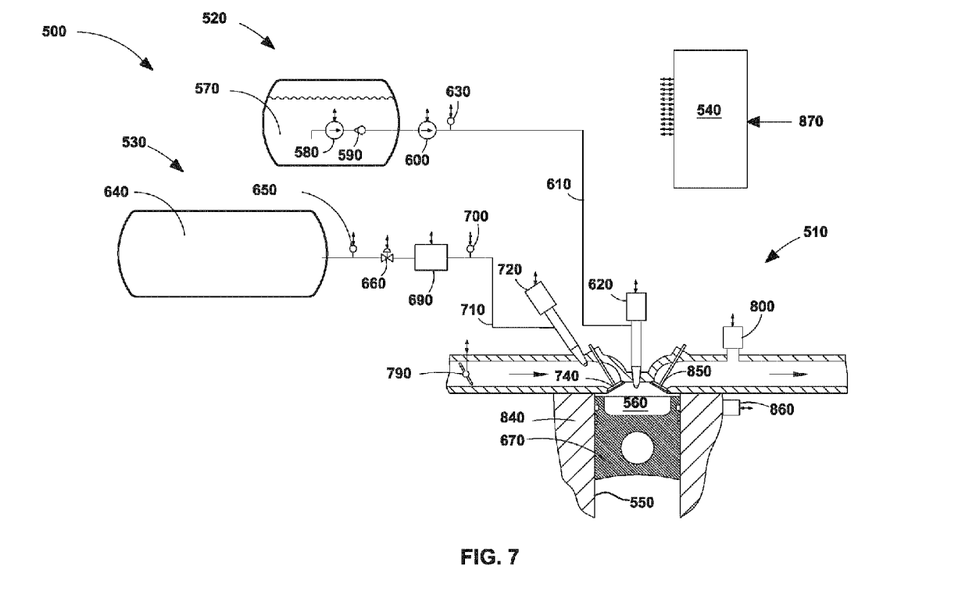
FIG. 7 is a schematic view illustrating one cylinder of the throttled internal combustion engine of FIG. 6.

Referring now to the schematic views of FIGS. 6 and 7, an apparatus 500 for fueling an internal combustion engine 510 with a gaseous fuel and a liquid fuel and employing the foregoing control technique is shown according to one embodiment. This embodiment is illustrative of an application of the foregoing control technique and is by no way limiting. Apparatus 500 comprises direct injection system 520, port injection system 530, engine 510 and electronic controller 540. A liquid pilot fuel from direct injection system 520 and a gaseous main fuel from port injection system 530 are introduced into engine 510 for combustion. Port injection system 530 is a preferred embodiment for introducing the gaseous main fuel; however in other embodiments a mixer can be employed in place of port injection system 530. Engine 510 also comprises intake manifold 730 and exhaust manifold 740. Intake air can be compressed by turbocharger system 750, comprising turbine 760 and compressor 770, or alternatively turbo bypass valve 780 can be opened such that intake air bypasses system 750. Throttle 790 under control of controller 540 regulates the mass flow of air into intake manifold 730. As shown in FIG. 6, engine 510 comprises at least one cylinder 550, for which a cross-section showing combustion chamber 560 of one such cylinder is shown in FIG. 7. The flow of air into cylinders 550 from intake air manifold 730 is controlled by intake valve 740, which can be opened during intake strokes of piston 670. Combustion products are expelled from combustion chamber 560 into exhaust manifold 740 through exhaust valve 850, which is opened during exhaust strokes of piston 670.

Exhaust gases from engine 510 leave exhaust manifold 740 and pass by sensor apparatus 800 operable to detect emissions, and in particular oxygen ($O_2$) and NOx concentrations in the combustion products in order to influence the fueling of engine 510 as described in the foregoing to control air-fuel ratio. Sensor apparatus 800 comprises an oxygen sensor which in the present embodiment is in the form of a universal exhaust gas oxygen (UEGO) sensor. Exhaust gas temperature sensor 805 is employed by the controller for turbo control. Vibration sensor 860, such as an accelerometer, is disposed adjacent a wall of cylinder 550 and is operable to detect vibrations from combustion chamber 560 characteristic of engine knock. Sensor 860 can be located elsewhere on engine 510, such as the bearing cap. Electronic controller 540 is responsive to signals from sensor 860 to influence the fueling of engine 540. A portion of the exhaust gases can be communicated to intake manifold 730 through exhaust gas recirculation (EGR) system 810 when EGR valve 820 is opened. An EGR cooler 830 reduces the temperature of exhaust gasses entering manifold 730. Exhaust gases not passing through EGR system 810 drive turbine 760, which in turn drives compressor 770, and the exhaust gases are then communicated to a catalytic converter (not shown). Engine 510 comprises other conventional components which are not shown. Engine 510 can be for a vehicle, and can also be employed in marine, locomotive, mine haul, power generation or stationary applications.

As best seen in FIG. 7, electronic controller 540 communicates with and commands both direct injection system 520 and port injection system 530 to deliver fuel for combustion in engine 510. Signal wires represented by the symbols with double arrow heads such as those on the left side of electronic controller 540, transmit measured parameters and send command signals for controlling the operation of individual components. Electronic controller 540 can comprise both hardware and software components. The hardware components can comprise digital and/or analog components. In the present example electronic controller 540 is a computer comprising a processor and memories, including one or more permanent memories, such as FLASH, EEPROM and a hard disk, and a temporary memory, such as SRAM or DRAM, for storing and executing a program. In another preferred embodiment electronic controller 540 is an engine control unit (ECU) for engine 510. As used herein, controller 540 is also referred to as "the controller".

Direct injection system 520 comprises storage vessel 570, which is made to store the liquid pilot fuel, which in the present embodiment is diesel. Pump 580 is operable to deliver diesel from storage vessel 570 to common rail pump 600. Check valve 590 allows diesel to flow towards common rail pump 600, and prevents, or at least reduces, diesel flowing back into vessel 570. There are additional components and alternative diesel supply systems used in direct injection systems which are also included in the scope of the present disclosure. Common rail pump 600 is operable to deliver diesel under pressure from storage vessel 570 to direct injectors 620 through common rail 610 at injection pressure. Pressure sensor 630 measures diesel pressure in common rail 610 such that pump 600 can be commanded by the controller to maintain diesel injection pressure between a predetermined range. Direct injector 620 is shown centrally located in the cylinder head, and can be located in cylinder block 840 in a side mounted orientation in alternative embodiments. Generally, the centrally located injector has better efficiency, whereas the side mounted injector has better performance due to increased cooling effect. Electronic controller 540 is programmed to selectively command the timing for opening and closing valve members in direct injectors 620 that respectively control the injection of diesel into cylinders 550. The diesel injection timing can be predetermined responsive to engine operating conditions determined from measured parameters that are inputted into electronic controller 540, and the input of such parameters among others is represented by arrow 870.

Port injection system 530 comprises storage vessel 640, which is made to store the gaseous main fuel, which in the present embodiment is natural gas. In other embodiments the gaseous main fuel can be methane, propane, biogas, landfill gas, hydrogen, mixtures of these fuels or other fuels that are in a gaseous phase at room temperature and atmospheric pressure. As used herein gas refers to natural gas, and in the other embodiments to one of the other gaseous fuels. In the illustrated embodiment, storage vessel 640 is rated to store gas up to a predetermined storage pressure, for example gas can be stored up to a pressure of 700 bar. Pressure sensor 650 measures the pressure of gas from vessel 640, which decreases as gas is consumed by engine 510. In other embodiments, storage vessel 640 can be a cryogenic storage vessel holding a multiphase fluid at cryogenic temperatures including a liquefied gaseous fuel, such as liquefied natural gas (LNG) or liquefied propane gas, and vapor such as natural gas vapor or propane gas vapor. In this situation fuel system 530 can comprise a liquid pump and an accumulator. In a stationary application, storage vessel 640 can be replaced by a gaseous-fuel supply conduit connected with a commercial gaseous-fuel supply line.

Pressure regulator 690 is operable to regulate gas pressure from storage vessel 640 to between 5 and 300 bar in supply rail 710, and more preferably to between 5 and 20 bar to maximize useable fuel mass in storage vessel 640. Pressure regulator 690 is an electronic pressure regulator commanded by controller 540, but in other embodiments can be a single-step mechanical regulator. Regulator 690 supplies gas at a regulated pressure to port injectors 720 through supply rail 710. Control valve 660 is a solenoid-type control valve operable to enable and disable communication of gas between vessel 640 and downstream components. Electronic controller 540 is programmed to control the operation of pressure regulator 690 and control valve 660 to control the gas pressure supply rail 710. For example, the controller can command pressure regulator 690 to decrease fuel pressure in supply rail 710 when engine 510 is operating in idle mode, and to increase fuel pressure when engine 510 is operating at other points in the operating map. Electronic controller 540 is programmed to selectively command the timing for opening and closing valve members in port injectors 720 that respectively control the injection of gas upstream of intake valves 740. In the illustrated embodiment injectors 720 are employed in a multi-point injection system in which there is a fuel injector for each intake port. In alternative embodiments each injector 720 can supply gas to more than one intake port. The injected gas and the charge of air in the intake manifold 730 enter the combustion chamber 560 where the gas/air mixture is compressed and ignited by combustion of diesel. The gas injection timing can be predetermined responsive to engine operating conditions determined from measured parameters that are inputted into electronic controller 540, and the input of such parameters among others is represented by arrow 870.

In one operating mode of engine 510 after a desired throttle position has been selected, only the quantity of natural gas (main fuel) is adjusted to control air-fuel ratio while the quantity of diesel (pilot fuel) is not adjusted to control air-fuel ratio. In this mode pilot fuel control module 180*a* is not employed, such that pilot fueling quantity 140*a* is equal to pilot fuel default amount 190*a*, as seen in FIG. 3, which is determined as a function of engine operating parameters 60. Control system 10 allows a full range of proportioning of diesel with respect to natural gas in this simplified mode. For example, during low load or idle conditions engine 510 will consume diesel at a higher percentage with respect to natural gas and during higher loads diesel will be consumed by engine 510 at a smaller percentage compared to natural gas. Since diesel is a pilot fuel, the variability in the quantity of diesel required for ignition over the range of engine operating conditions is substantially less than the variability in the quantity of natural gas, which is primarily employed for generating torque for engine 510. A result of this variability is that system 10 without control modules 180*a* and 180*b* is highly nonlinear. As an example, if engine 510 consumes 5% diesel and 95% natural gas (high load condition), control system 10 would operate similar to a situation in which % 100 of the fuel consumed was natural gas. On the other hand, if engine 510 consumed 90% diesel and 10% natural gas (low load or idle condition) the gains of control system 10 would need to be approximately ten times (1 Ox) greater for the same response.

Natural gas control module 180*b* (seen in FIG. 4) is formulated in this one operating mode to linearize control of lambda by introducing the percentage of natural gas into the control equations. Eqn. 1 below represents natural gas default amount 190*b* at stoichiometry ($F_{ng-s}$) that is equal to the fraction of total fuel that is natural gas $$\left(\frac{\%NG}{100}\right)$$

times a quantity of natural gas ($F_{ngb-s}$) from a base table (map) calibrated to operate on 100% natural gas. Eqn. 2 represents diesel default amount 190*a* at stoichiometry ($F_{dng-s}$) expressed as an equivalent quantity of natural gas. Eqn. 3 is an expression for total fueling quantity 140 ($F_{tot}$), without adjustment for lambda or lambda errors, at stoichiometry. In eqn. 3, $F_{tot}$ is equal to the sum of diesel default amount 190*a* ($F_{d-ng-s}$) and natural gas default amount 190*b* ($F_{ng-s}$) at stoichiometry. Total fueling quantity 140 ($F_{tot}$) at any lambda value is obtained by dividing eqn. 3 by target lambda 80 ($\lambda_{target}$). Eqn. 4 represents the general case for which diesel default amount 190*a* is also adjusted by target lambda. From eqn. 4, when target lambda 80 ($\lambda_{target}$) equals one (1) total fueling quantity 140 ($F_{tot}$) reduces to eqn. 3, the stoichiometric value. In the current operating mode, diesel is not adjusted to control lambda. It is advantageous for eqn. 4 to be reformulated to express diesel as a proportion of natural gas such that the diesel portion of lambda adjustment in the general case can be obtained with natural gas in this simplified operating mode. This is accomplished through algebraic manipulation of eqn. 4 as illustrated in eqns. 5 through 16. In eqn. 5, stoichiometric diesel terms are introduced in order to facilitate the transformation of the diesel portion for lambda adjustment into an auxiliary natural gas portion for lambda adjustment. Eqn. 6 is a reformulated expression for natural gas default amount 190b ($F_{ng\_tot}$) which in the current mode is equal to the difference between total fueling quantity 140 ($F_{tot}$) and the stoichiometric diesel default amount 190a ($F_{d\sim ng\sim s}$). Eqn. 5 is substituted into eqn. 6 resulting in eqn. 7, and after factoring the terms results in eqn. 8. Eqn. 8 is an expression for natural gas default amount 190b ($F_{ng\_tot}$) at target lambda 80 ($\lambda_{target}$). To eliminate the diesel term, eqn. 2 is substituted into eqn. 8 resulting in eqn. 9, and after expanding, collecting and factoring terms results in eqn. 10. Eqn. 11 is an expression for total fueling quantity 140 ($F_{tot}$) in the current mode, and is equal to the sum of diesel default amount 190a ($F_{d\sim ng\sim s}$) at stoichiometry and natural gas default amount 190b ($F_{ng\_tot}$) represented by eqn. 10. Diesel default amount 190a ($F_{d\sim ng\sim s}$) is determined by determination module 170a, as seen in FIG. 3, and natural gas default amount 190b ($F_{ng\_tot}$) is determined by determination module 170b, as seen in FIG. 4.

In this one operating mode, integration control modules 220a and 220b (seen in FIGS. 3 and 4) can have the form as shown in eqn. 12, and proportional control modules 210a and 210b (seen in FIGS. 3 and 4) can have the form as shown in eqn. 13. In both eqns. 12 and 13 the expression $$\left(\frac{1}{\lambda_{target}} - \frac{1}{\lambda_{actual}}\right)$$

is equivalent to air-fuel ratio error 120. $G_I$ and $G_p$ are constants, and $I_n$ and $I_{n-1}$ are known as discrete recursive representation to those familiar with the technology. Control modules 210a, 210b, 220a and 220b are incorporated into the equation for total fueling quantity 140 according to eqn. 14. The first term in eqn. 14 is diesel default amount 190a and represents the natural gas equivalent of diesel, which will be introduced into combustion chamber 560 as diesel. The second term is the natural gas default amount 190b and represents the total amount of natural gas, which includes a portion of natural gas that is derived from a calibration table and a portion of natural gas required to make a lambda adjustment. The third term is natural gas error amount 200b and represents a natural gas correction for lambda error 120. The fourth term is diesel error amount 200a and represents a diesel correction for lambda error 120 expressed as a natural gas equivalent. The inclusion of the fourth term linearizes the control of lambda over the operating range of engine 510. The diesel correction in the fourth term is transformed into a natural gas correction by substituting eqn. 2 into eqn. 14 resulting in eqn. 15, and after expanding, collecting and factoring terms results in eqn. 16. Eqn. 16 captures the fuel control for the simplified operating mode. In eqn. 16, diesel default amount 190a is equal to diesel fueling quantity 140a. This approach allows diesel fueling quantity 140a to be determined with a set of equations and calibration tables that are independent of the control of air-fuel ratio. An example of the advantage of this approach is diesel fueling quantity 140a can be controlled independently of lambda to control emissions, and a quantity of diesel independent of lambda can be employed to initiate combustion. The linearization of lambda control improves performance of control system 10 by adjusting the gain according to the percentage of natural gas, which reduces transient deviations from target lambda 80.

$$F_{ng\sim s} = F_{ngb\sim s} \times \frac{\%NG}{100} \quad \text{eqn. 1}$$

$$F_{d\sim ng\sim s} = F_{ngb\sim s} \times \left(1 - \frac{\%NG}{100}\right) \quad \text{eqn. 2}$$

$$F_{tot} = F_{d\sim ng\sim s} + F_{ng\sim s} \leftarrow \lambda_{target} = 1 \quad \text{eqn. 3}$$

$$F_{tot} = F_{d\sim ng\sim s}\frac{1}{\lambda_{target}} + F_{ng\sim s}\frac{1}{\lambda_{target}} \quad \text{eqn. 4}$$

$$F_{tot} = F_{d\sim ng\sim s} - F_{d\sim ng\sim s} + F_{d\sim ng\sim s}\frac{1}{\lambda_{target}} + F_{ng\sim s}\frac{1}{\lambda_{target}} \quad \text{eqn. 5}$$

$$F_{ng\_tot} = F_{tot} - F_{d\sim ng\sim s} \quad \text{eqn. 6}$$

$$F_{ng\_tot} = -F_{d\sim ng\sim s} + F_{d\sim ng\sim s}\frac{1}{\lambda_{target}} + F_{ng}\frac{1}{\lambda_{target}} \quad \text{eqn. 7}$$

$$F_{ng\_tot} = F_{d\sim ng\sim s}\left(-1 + \frac{1}{\lambda_{target}}\right) + F_{ng\sim s}\frac{1}{\lambda_{target}} \quad \text{eqn. 8}$$

$$F_{ng\_tot} = F_{ngb\sim s}\left(1 - \frac{\%NG}{100}\right)\left(-1 + \frac{1}{\lambda_{target}}\right) + F_{ngb\sim s}\left(\frac{\%NG}{100}\right)\frac{1}{\lambda_{target}} \quad \text{eqn. 9}$$

$$F_{ng\_tot} = F_{ngb\sim s}\left(-1 + \frac{1}{\lambda_{target}} + \frac{\%NG}{100}\right) \quad \text{eqn. 10}$$

$$F_{tot} = F_{d\sim ng\sim s} + F_{ng\_tot} \quad \text{eqn. 11}$$

$$I_n = I_{n-1} + G_I\left(\frac{1}{\lambda_{target}} - \frac{1}{\lambda_{actual}}\right) \quad \text{eqn. 12}$$

$$P = G_p\left(\frac{1}{\lambda_{target}} - \frac{1}{\lambda_{actual}}\right) \quad \text{eqn. 13}$$

$$F_{tot} = F_{d\sim ng\sim s} + F_{ng\_tot} + F_{ng\_tot}(I + P) + F_{d\sim ng\sim s}(I + P) \quad \text{eqn. 14}$$

$$F_{tot} = F_{d\sim ng\sim s} + F_{ng\_tot} + \left(F_{ng\_tot} + F_{ngb\sim s}\left(1 - \frac{\%NG}{100}\right)\right)(I + P) \quad \text{eqn. 15}$$

$$F_{tot} = F_{d\sim ng\sim s} + F_{ngb\sim s}\left(-1 + \frac{\%NG}{100}\right) + \frac{F_{ngb\sim s}}{\lambda_{target}} + F_{ngb\sim s}(I + P) \quad \text{eqn. 16}$$

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method for controlling air-fuel ratio in an internal combustion engine consuming more than one fuel type comprising:
    (a) determining a target air-fuel ratio as a function of engine operating conditions;
    (b) determining an actual air-fuel ratio from said engine operating conditions;
    (c) determining a first fuel quantity of a first fuel to introduce into a combustion chamber of said internal combustion engine as a function of said engine operating conditions;
    (d) determining a second fuel quantity of a second fuel such that said actual air-fuel ratio equals said target air-fuel ratio to within a predetermined range of tolerance when said first fuel quantity and said second fuel quantity are introduced into said combustion chamber, said second fuel quantity determined as a function of said engine operating conditions, said target air-fuel ratio, said actual air-fuel ratio and said first fuel quantity; and
(e) introducing said first fuel quantity and said second fuel quantity into said combustion chamber.

2. The method of claim 1, further comprising:
(f) repeating steps (b) and (e) when said engine operating conditions remain unchanged within a predetermined range of tolerance; and
(g) for each repetition of step (b), at least repeating step (d) when said actual air-fuel ratio determined in step (b) is not equal to said target air-fuel ratio to within a predetermined range of tolerance.

3. The method of claim 1, wherein said first fuel is a liquid fuel and said second fuel is a gaseous fuel.

4. The method of claim 1, wherein said first fuel is diesel.

5. The method of claim 1, wherein said second fuel is natural gas.

6. The method of claim 1, wherein said second fuel is selected from the group consisting of ethane, methane, propane, biogas, landfill gas, hydrogen and mixtures thereof.

7. The method of claim 1, wherein said first fuel is a pilot fuel and said second fuel is a main fuel.

8. The method of claim 1, wherein said first fuel is directly introduced into said combustion chamber and said second fuel is introduced into a suction pipe upstream of an intake valve of said combustion chamber.

9. The method of claim 1, wherein said target air-fuel ratio corresponds to an excess air-fuel ratio of one to within a predetermined range of tolerance.

10. The method of claim 1, wherein said internal combustion engine is throttled.

11. The method of claim 1, further comprising:
(f) calculating an air-fuel ratio error as the difference between said target air-fuel ratio and said actual air-fuel ratio; and
(g) in step (d), determining said second fuel quantity as a function of said engine operating conditions, said target air-fuel ratio, said air-fuel ratio error and said first fuel quantity.

12. The method of claim 11, wherein said second fuel quantity equals a first amount of said second fuel plus a second amount of said second fuel, said first amount equal to a function of said engine operating conditions, said target air-fuel ratio and said first fuel quantity, said second amount equal to a function of said air-fuel ratio error.

13. The method of claim 12, wherein said function of said air-fuel ratio error corresponds to at least one of a proportional control module, an integral control module and a derivative control module, each of said control modules responsive to said air-fuel ratio error.

14. The method of claim 12, wherein said function of said air-fuel ratio error corresponds to a control module responsive to said air-fuel ratio error and operable to adjust said second fuel quantity to reduce said air-fuel ratio error to zero within said predetermined range of tolerance.

15. The method of claim 1, wherein said function for determining said second fuel quantity comprises a gain that is one of a function of a percentage of total fuel of said first fuel quantity and a function of a percentage of total fuel of said second fuel quantity.

16. The method of claim 1, wherein in step (c) said first fuel quantity is determined as a function of at least one of said engine operating conditions, said target air-fuel ratio, said actual air-fuel ratio and said second fuel quantity.

17. The method of claim 16, wherein when said target air-fuel ratio is not equal to said actual air-fuel ratio to within a predetermined range of tolerance said first fuel quantity and said second fuel quantity are adjusted by at least one of an equal percentage and an equal amount within a range of tolerance.

18. The method of claim 16, wherein when said target air-fuel ratio is not equal to said actual air-fuel ratio to within a predetermined range of tolerance said first fuel quantity and said second fuel quantity are adjusted by at least one of a different percentage and a different amount.

19. The method of claim 1, wherein said second quantity of said second fuel is determined according to the formula:

$$F_{ngb\sim s}\left(-1 + \frac{\%NG}{100}\right) + \frac{F_{ngb\sim s}}{\lambda_{target}} + F_{ngb\sim s}(I + P)$$

where:
$F_{ngb\sim s}$ is a base quantity of natural gas, determined from a base map indexed by engine operating conditions or from a base function of engine operating conditions, employed for an internal combustion engine operating with said second fuel only at stoichiometry;
% NG is a percentage of total fuel that is said second fuel;
$\lambda_{target}$ is said target air-fuel ratio;
I is an integral control term; and
P is a proportional control term.

20. An apparatus for controlling air-fuel ratio in an internal combustion engine consuming more than one fuel type comprising:
(a) a direct fuel injector introducing a first fuel into a combustion chamber of said internal combustion engine;
(b) a second fuel injector introducing a second fuel into said combustion chamber;
(c) an electronic control programmed to:
(i) determine a target air-fuel ratio as a function of engine operating conditions;
(ii) determine an actual air-fuel ratio from said engine operating conditions;
(iii) determine a first fuel quantity of said first fuel to introduce through said direct fuel injector as a function of said engine operating conditions;
(iv) determine a second fuel quantity of said second fuel such that said actual air-fuel ratio equals said target air-fuel ratio to within a predetermined range of tolerance when said first fuel quantity and said second fuel quantity are introduced into said combustion chamber, said second fuel quantity determined as a function of said engine operating conditions, said target air-fuel ratio, said actual air-fuel ratio and said first fuel quantity; and
(v) actuate said direct fuel injector to introduce said first fuel quantity and said second fuel injector to introduce said second fuel quantity into said combustion chamber.

21. The apparatus of claim 20, wherein said second fuel injector introduces said second fuel into a suction pipe upstream of an intake valve of said combustion chamber.

22. The apparatus of claim 20, wherein said second fuel injector introduces said second fuel directly into said combustion chamber.

* * * * *